(12) United States Patent
Maruo et al.

(10) Patent No.: US 6,245,695 B1
(45) Date of Patent: Jun. 12, 2001

(54) BINDER COMPOSITION AND COATING COMPOSITION FOR DECORATIVE PAPER BOTH BASED ON POLYURETHANE RESIN, AND LAMINATED CLOTH AND AIR BAG BOTH HAVING COATING OF THE SAME

(75) Inventors: Katsuya Maruo; Toshio Endo, both of Ohtake; Tomohisa Isobe, Iwakuni; Kiyoshi Okitsu, Shizuoka, all of (JP)

(73) Assignee: Daicel Chemical Industries, Ltd. (JP)

( * ) Notice: Subject to any disclaimer, the term of this patent is extended or adjusted under 35 U.S.C. 154(b) by 0 days.

(21) Appl. No.: 09/180,544

(22) PCT Filed: Mar. 12, 1998

(86) PCT No.: PCT/JP98/01051

§ 371 Date: Feb. 8, 1999

§ 102(e) Date: Feb. 8, 1999

(87) PCT Pub. No.: WO98/40438

PCT Pub. Date: Sep. 17, 1998

(30) Foreign Application Priority Data

Mar. 12, 1997 (JP) .................................................. 9-076500
Sep. 29, 1997 (JP) .................................................. 9-281392

(51) Int. Cl.[7] .......................... B32B 27/04; B32B 27/12; B32B 5/02
(52) U.S. Cl. .......................... 442/136; 442/59; 428/34.1; 428/35.7
(58) Field of Search .................. 442/136, 59; 428/34.1, 428/35.7

(56) References Cited

U.S. PATENT DOCUMENTS

| | | | |
|---|---|---|---|
| 5,100,999 | * 3/1992 | Murai et al. | 528/76 |
| 5,556,925 | * 9/1996 | Kousaka et al. | 525/440 |
| 5,563,195 | * 10/1996 | Namba et al. | 524/247 |
| 5,811,489 | * 9/1998 | Shirai et al. | 525/66 |
| 6,001,469 | * 12/1999 | Verardi et al. | 428/333 |

* cited by examiner

Primary Examiner—Terrel Morris
Assistant Examiner—Norca L. Torres
(74) Attorney, Agent, or Firm—Morgan & Finnegan, LLP

(57) ABSTRACT

A polyurethane resin obtained from a diisocyanate compound and a polyester polyol. The polyester polyol may (1) comprise not less than 50% by weight of a polyester glycol having a molecular weight of 500–5,000, the polyester glycol being obtained by reacting an acid and 3,3,5-trimethyl-1,6-hexanediol or 2,2,4-trimethyl-1,6-hexanediol and have a molecular weight of 500–5,000, (2) have a number average molecular weight of 500–5,000 and an alcohol hydroxyl group at terminals thereof and comprise not less than 50% by weight of ester units, the ester units being derived from a dicarboxylic acid and 3,3,5-trimethyl-1,6-hexanediol and/or 2,2,4-trimethyl-1,6-hexanediol, or (3) have a number-average molecular weight of 500–5,000 and comprise not less than 50% by weight of ester units of an aliphatic dicarboxylic acid and trimethyl-1,6-hexanediols. The above polyurethane resins may be combined with chlorinated polyolefin and then used in binder compositions or, alternately used in coating compositions for decoration paper made of a polyolefin resin. The above polyurethane resins may also be laminated on at least one surface of a woven cloth made of synthetic resin to form a laminated clothing that may further be used in an air bag for a vehicle.

18 Claims, No Drawings

BINDER COMPOSITION AND COATING COMPOSITION FOR DECORATIVE PAPER BOTH BASED ON POLYURETHANE RESIN, AND LAMINATED CLOTH AND AIR BAG BOTH HAVING COATING OF THE SAME

The first aspect of the invention relates to a binder composition and to an adhesive composition using the binder composition. In more detail, the first aspect of the invention concerns a binder composition, a coating, a printing ink and an adhesive composition which show excellent adhesive properties for synthetic resins having many different features.

The second aspect of the invention relates to a coating composition used for a decoration paper which is made of a polyolefin-type synthetic resin and to the corresponding coating itself used for a decoration paper made of a polyolefin-type synthetic resin and which contains the above-mentioned coating composition. In more detail, it relates to a coating and a coating composition which are able to provide a paint having excellent coatability and excellent adhesive properties for a decoration paper made of a polyolefin-type resins and also to provide a coated layer obtained by coating a decoration paper made of a polyolefin-type synthetic resin without any loss of gloss, outer appearance or the like.

The third aspect of the present invention concerns a laminated cloth obtained by coating a specified polyurethane resin on a cloth and an air bag using the laminated cloth. Particularly, the third aspect of the invention relates to a laminated cloth obtained by coating onto a woven cloth made of a synthetic resin, a polyurethane resin containing an aliphatic polyester polyol, a preparation method thereof and to an air bag for vehicles which uses such a laminated cloth.

BACKGROUND OF THE INVENTION

The first aspect of the invention will now be described.

Since synthetic resins have interesting features such as a high productivity, being capable of widely selecting in designing, having a low weight, a high rust resistance and a high impact resistance. Therefore, they are widely used as materials such as construction materials, materials for electric parts and car parts.

Above all, since the polyolefin-type resin is inexpensive and moreover has excellent moldability, chemical resistance, thermal resistance and water resistance, and further has suitable electrical features, it is widely used as industrial materials and is one of the materials whose demand is expected to grow in the future.

However, the coating or painting and the adhesion of the polyolefin-type resins on a surface are difficult because of their non-polarity and their crystallinity. The polyolefin-type resins are different from the polyurethane-type resins, the polyamide-type resins, the acrylic resins and the polyester-type resins or the like which are polar resins. For these reasons, the polyolefin surface of molded articles is activated by a plasma treatment or a gas flame treatment to improve their adhesive properties. However, these processes are complicated and involve high equipment costs and large time losses. Further, depending on the complexity of the shape of the molded articles and the influence of the pigments and the additives in the resin, there scatters an effect by the surface treatment.

As a coating method without previous treatment, the use of a primer composition has been indicated for coating polypropylene car bumpers. However, this method includes complexity of "double-coat finishing". On the other hand, as a coating composition for a single-coat finishing, chlorinated polyolefins and cyclized rubbers or the like are used which have a high adhesion onto polyolefin-type resins. However, their weatherability, moisture resistance and gasoline resistance are low and they do not show properties to form a coated layer. For these reasons, an attempt to use a mixture of alkyd resins and acrylic resins which have excellent physical properties as coatings has been tested but, since the compatibility of the chlorinated polyolefins with the acrylic resins and the alkyd resins is inherently poor, the gloss of the coated layer is lowered and the outer appearance thereof is extremely damaged.

Several methods to improve this drawback have been disclosed. JP-A-58071966 discloses a coating composition obtained by copolymerizing an acrylic monomer with a chlorinated polyolefin. JP-A-59027968 discloses a coating composition essentially containing an isocyanate compound and a chlorinated polyolefin-modified copolymer having hydroxyl groups obtained by copolymerizing an acrylic monomer or the like having hydroxyl group with a chlorinated polyolefin. JP-A-62095372 discloses an adhesive resin composition containing as a main component an isocyanate compound and an acrylic-modified chlorinated polyolefin having hydroxyl groups obtained by copolymerization of an acrylic monomer or the like having hydroxyl group with a chlorinated polyolefin in presence of liquid-state rubber.

However, these compositions also form rigid films by painting and have low impact resistance and bending resistance.

Therefore, it may hardly be said that they form balanced coated layers.

On the other hand, several kinds of plastic films have been developed and used as materials for wrapping food. The materials for wrapping food are diversified in wrapping shapes and particularly, composite films obtained from a laminated film are widely used for protecting the object which is wrapped therein.

Generally, the ink for laminates which are used for wrapping is used and classified into two categories depending on the type of the film, at present. The first category is an ink composition used exclusively for polypropylene film which contains a chlorinated polypropylene and a chlorinated ethylene-vinyl acetate copolymer, as a main binder. The second category is used exclusively for polyester and nylon films and it is an ink composition comprising a urethane-type resin, as a main binder.

The former first category which is an ink composition containing chlorinated polypropylene and a chlorinated ethylene-vinyl-acetate copolymer, as a main binder, is explained, for example, in JP-B-86031670 and the ink composition obtained by chlorosulphonation of a copolymer of chlorinated ethylene and vinyl acetate is disclosed in JP-A-55145775. These compositions provide inks having a good adhesion onto non-treated polypropylene film and further show a good adhesion even in the case of laminate printing with the extrusion-laminating method.

However, they have a poor adhesion onto polyester and nylon films and are not suitable as printing ink used for laminates of these films.

The latter category which is an ink composition comprising a urethane-type resin, as a main binder, shows, as explained in JP-A-62153366 and JP-A-62153367 a good adhesion for the polyester and nylon films or other films having a polarity but does not show any adhesion with untreated polypropylene films and, therefore, is impossible for printing under a polypropylene-extrusion laminating method.

JP-A-64085226 disclosed, as a resin used as ink suitable for printing by the extrusion-laminating method applied to a polypropylene and for printing a laminate such as polyester and nylon films, a polyurethane-modified chlorinated polypropylene obtained by reacting a polyurethane comprising a free isocyanate group with a chlorinated polypropylene which has been modified with a vinyl monomer having hydroxyl group to introduce hydroxyl group into the above-mentioned chlorinated polypropylene.

However, in this method, the content of the chlorinated polypropylene is limited in the corresponding composition and the extrusion laminate strength of the polypropylene is insufficient.

In the existing circumstances, developments regarding strong binder compositions, easy surface treatment for various synthetic resins having different features, coating and printing inks are therefore expected.

The second aspect of the invention will now be described hereinafter.

Since the polyolefin-type resins are inexpensive and have several excellent properties such as moldability, chemical resistance, thermal resistance, water resistance and the like, they are recently widely used as a decoration paper and, particularly as a wall-decoration paper used in construction or the like.

However, the polyolefin-type resins are non-polar and highly crystalline as explained in the first aspect of the present invention. Thus, they have a drawback that it is difficult to coat the surface of the molded articles such as films or sheets of polyolefin-type resins and to cover the surface of another article with a polyolefin film or sheet by using adhesives.

Therefore, in the prior art, as explained in the first aspect of the invention, there have been proposed counter-measures such as a plasma treatment or gas flame treatment of the surface of the molded articles, a "double-coat finishing" using various primer compositions as observed in the surface coating for the car bumpers or a "single-coat finishing" by using a composition of a cyclized rubber and a chlorinated polyolefin and a mixture of alkyd resins and acrylic resins having the desirable coating properties, weatherability, moisture resistance and petrol resistance. However none of these countermeasures has sufficiently solved these problems.

Recently, the air bag for ensuring drivers' security in cars has been widely employed. In case of a car accident with an impact, a sensor catches the impact, and a high temperature-high pressure gas is produced. The air bag is immediately inflated by this gas and protects the driver's face and head portions against a front shock. The air bag also protects the driver's head portion and internal organs against a lateral shock.

In these air bags, flatly-woven cloths having a strong mechanical strength are usually employed which comprise filament yarns of 400-1000 Deniers made of a synthetic resin such as a polyester, 6,6-nylon, 6-nylon or the like. The internal surface of this cloth or the external surface thereof or both internal and external surfaces are coated with a chloroprene rubber, chloro-sulphonated polyolefins, a silicone rubber or other synthetic rubbers or elastomers to improve the thermal resistance, the weatherability, the fireproof properties and the air-tightness of the cloth. The air bag is made of the resulting composite cloth which is bag shaped and must be light and be able to be folded compactly.

In JP-A-02270654, an air bag folded in a compact manner is described which is made of a thin film of a silicone rubber formed on a woven cloth. However, despite the excellent thermal resistance and weatherability of the silicone rubber, it is difficult to laminate the cloth. Some mold may appear on the obtained film thereby involving life-span troubles and facilitating the occurrence of pin holes and other problems.

In JP-A-04097842, an air bag is disclosed which is made by laminating a polyolefin-type resin or other ionomer resin, an ethylene-vinyl acetate copolymer, an ethylene-propylene copolymer on a woven cloth. However, the adhesion between the woven cloth and the resins, the weatherability as well as the inflation of the air bag were not sufficient.

In JP-A-04143145, a polyurethane is disclosed which is obtained from an isocyanate and a copolymer of vinyl chloride containing polyols coated onto a woven cloth. There, however, were also some drawbacks when using these resins, since these resins contain vinyl chloride, a plasticizer has to be added and when the air bag is kept during a long-time in its housing position, the plasticizer leaks out and the base cloth itself then becomes sticky.

The purposes of the invention will now be explained hereinafter.

The purpose of the first aspect of the invention is to provide an adhesive composition and a printing ink composition having excellent printing and adhesive properties for films of various resins having different features.

The purpose of the second aspect of the present invention is to provide a coating composition and a coating using this coating composition having excellent coatability and adhesion, improved coatability and the adhesion on the surface of polyolefin-type molded articles thereby giving a coated layer which is specifically used on a decoration paper made of the same resin, provides a coated layer without any deterioration of the external appearance or gloss of the film.

The purpose of the third aspect of the invention is to provide a method of producing a simple laminated cloth, by virtue of an improved adhesion between woven cloths and a resin, without any adhesion between the woven cloths, the corresponding air bag made from this laminated cloth and the manufacturing method thereof.

DISCLOSURE OF THE INVENTION

The inventors of the present invention have discovered what is explained hereinafter and have achieved the present invention as a result of intensive research.

The first aspect of the present invention concerns a synthetic resin composition obtained from a specified polyurethane resin (I-1) and a chlorinated polyolefin (I-2). It is possible by using the above-mentioned synthetic resin composition to obtain as a binder for a single coating onto synthetic resins having different features such as polypropylenes, nylons, polyesters and others. Further, by using the above-mentioned resin composition, it is possible to obtain an adhesive composition and a printing ink composition having excellent adhesive and printing properties for synthetic-resin films having various and different features.

According to the second aspect of the present invention, a coating composition and a paint containing the coating composition can be obtained which have an excellent adhesion and coatability without loss of gloss and outer appearance in a coated layer produced by coating the coating composition onto a decoration paper made of a polyolefin-type resin. The coating composition comprises a polyurethane resin (II-1) and a chlorinated polyolefin (II-2).

The polyurethane resin (II-1) is obtained by allowing a high molecular weight polyester polyol to react with a diisocyanate compound. The high molecular weight polyester polyol contains a polyester polyol having a specified molecular weight and a specified molecular weight distribution.

The polyester polyol is obtained from a specified polyol and a dicarboxylic acid.

The third aspect of the present invention relates to an air bag obtained by using laminate materials which are a polyurethane using specified polyester polyols. This laminate material confer the inflatability, the adhesion to a woven cloth, weatherability and pin-hole resistance to the resulting air bag without bleeding of additives. The air bag of the present invention is further readily obtained, has a light thin layer and has a high mechanical strength.

The first, second and third aspects of the present invention will now be explained hereinafter.

The first aspect of the present invention provides a binder composition obtained by a chlorinated polyolefin (I-2) and a polyurethane (I-1). The polyurethane (I-1) is obtained by reacting a diisocyanate compound with a high molecular weight polyester polyol containing more than 50% by weight of polyester glycol having a molecular weight of 500–5,000. This polyester glycol is obtained by reacting 3,3,5-trimethyl-1,6-hexanediol or 2,2,4-trimethyl-1,6-hexanediol with an acid. Further, the first aspect I of the invention concerns a paint material, a printing ink and an adhesive composition obtained from the above-mentioned binder composition and an isocyanate compound.

The second aspect of the invention provides a coating composition used for a decoration paper made of a polyolefin-type resin. This coating composition comprises essentially a chlorinated polyolefin (II-2) and a polyurethane resin (II-1).

The polyurethane resin (II-1) is obtained by reacting an diisocyanate compound with a high molecular weight polyester polyol having a number-average molecular weight of 500–5,000.

This polyester polyol has not less than 50% by weight of ester units derived from a dicarboxylic acid and 3,3,5-trimethyl-1,6-hexanediol or 2,2,4-trimethyl-1,6-hexanediol.

The two terminals of the polyester polyol have an alcohol hydroxyl group. Further, the second aspect of the present invention also provides a coating composition for a decoration paper made of a polyolefin-type resin wherein the above-mentioned dicarboxylic acid is an aliphatic dicarboxylic acid. Still further, the invention also provides a coating composition for decoration paper according to the second aspect of the present invention wherein the aliphatic dicarboxylic acid is adipic acid and a coating composition for a decoration paper made of a polyolefin-type resin containing a coating composition as mentioned in the second aspect of the invention.

The third aspect of the invention provides a laminated cloth made from a polyurethane resin laminated, at least, on one face of a synthetic resin-fiber made woven material. The above-mentioned polyurethane resin is synthesized from a diisocyanate compound and a polyester polyol having a number average molecular weight of 500–5,000 and having more than 50% by weight of ester units of 1,6-trimethylhexanediol and aliphatic dicarboxylic acid.

Further, the invention provides a laminated cloth wherein the above-mentioned aliphatic dicarboxylic acid is adipic acid and a laminated cloth comprising a polyurethane resin containing a flame retardant.

The present invention also provides an air bag used for vehicles made from the above-mentioned laminated cloth.

BEST MODE OF THE INVENTION

The first, second and third aspects of the present invention will be further explained below with Examples and embodiments for each of these aspects. However, the present invention is not limited to these Examples and embodiments.

The first aspect of the present invention will be explained in greater detail below.

Binder Composition

The binder composition of the first aspect of the invention is obtained from a chlorinated polyolefin (I-2) and a polyurethane resin (I-1). The above-mentioned polyurethane resin is obtained by reacting a diisocyanate compound with a high molecular-weight polyester-polyol.

Preferably, the high molecular-weight polyester-polyol used in the first aspect of the invention has a molecular weight of 500–5,000. When the molecular weight is less than 500, the miscibility with a diluent is lowered thereby harming the printing applicability. When the molecular weight is more than 5,000, the drying properties and the blocking resistance are insufficient.

Specifically, examples of the high molecular weight polyester polyol are presented below.

(1) polyester polyols derived from a polymer or a copolymer of ethylene oxide, propylene oxide, tetrahydrofuran or the like.

(2) polyester polyols comprising polyesterglycols obtained by a dehydration condensation of acid anhydride compounds corresponding to a di-basic acid or the di-basic acid itself such as adipic acid, phthalic anhydride, isophthalic acid, terephthalic acid, maleic acid, fumaric acid, succinic acid, oxalic acid, malonic acid, glutaric acid, pymeric acid, suberic acid, azelaic acid, sebacic acid or the like with 3,3,5-trimethyl-1,6-hexanediol, 2,2,4-trimethyl-1,6-hexanediol, glycerin, trimethylol propane, trimethylol ethane, 1,2,6-hexanetriol, 1,2,4-butanetriol, penta-erythritol, sorbitol, ethylene glycol, 1,3-propanediol, 1,3-butanediol, 1,4-butanediol, neopentylglycol, pentanediol, hexanediol, octanediol, 1,4-butine diol, diethylene glycol, triethylene glycol, dipropylene glycol or other saturated or unsaturated low molecular-weight glycols.

(3) polyester polyols obtained by a ring-opening polymerization of cyclic ester compounds;

(4) polycarbonate polyols;

(5) glycols obtained by adding propylene oxide or ethylene oxide on polybutadiene glycols or bisphenol-A;

(6) any other kinds of known high molecular-weight polyester-polyols generally used to produce polyurethanes.

The high molecular-weight polyester-polyols used in the first aspect of the invention are, among the above-mentioned polyester polyols (2), the polyester glycols obtained from 3,3,5-trimethyl-1,6-hexanediol or 2,2,4-trimethyl-1,6-hexanediol and an acid. More specifically, the polyester glycols obtained by a dehydration condensation of 3,3,5-trimethyl-1,6-hexanediol or 2,2,4-trimethyl-1,6-hexanediol and preferably adipic acid. These polyester glycols contain 50% by weight of a polymer having a number-average molecular weight of 500–5,000 and in particular, preferably, of 700–3,000. When the number-average molecular weight is between these values, an excellent solubility in solvents for dilution, an excellent dryability and an excellent blocking resistance can be obtained even though polyols are employed which have a high molecular weight. Moreover, when the % by weight is not less than 50% or when it is less than 50%, sometimes, a sufficient adhesion on a printing base-material may not be occasionally obtained.

The polyester polyols to be employed in the present invention, reacting with a diisocyanate compound may comprise, except the high molecular weight ester polyols, the high molecular weight polyester polyols containing not more than 10% by weight of a polytrimethyl-hexanediol adipate and other low molecular weight polyester polyols with respect to the amount by weight of the high-molecular weight polyester-polyols. When the % by weight is more than 10%, the adhesion of the resulting printing ink composition with the plastic film and its solubility in the solvents for dilution are lowered.

The diisocyanate compounds used in the present invention include aromatic diisocyanates, aliphatic and cycloaliphatic diisocyanates.

Specifically, 1,5-naphthalene diisocyanate, 4,4-diphenyl-methane diisocyanate, 4,4'-diphenyl-methane diisocyanate, 4,4'-dibenzyl-isocyanate, dialkyl-diphenyl-methane isocyanate, tetra-alkyl-diphenyl methane diisocyanate, 1,3-phenylene diisocyanate, 1,4-phenylene diisocyanate, trylene diisocyanate, butane-1,4-diisocyanate, hexamethylene diisocyanate, 2,2,4-trimethyl-hexamethylene diisocyanate, 2,4,4-trimethyl-hexamethylene diisocyanate, tridinediisocyanate, cyclohexane-1,4-diisocyanate, xylilene diisocyanate, isophorone diisocyanate, dicyclohexyl-methane-4,4'-diisocyanate, 1,3-bis (isocyanate methyl) cyclohexane, methyl-cyclohexane diisocyanate or the like may be exemplified.

The polyurethane resins used in the present invention can be prepared by a general method consisting of reacting, in one step, a high molecular weight polyester polyol with a diisocyanate compound, optionally a chain extender and a polymerization inhibitor, in a suitable solvent.

Moreover, it is possible to produce these polyurethane resins by a two-step method consisting of preparing a pre-polymer of a high molecular-weight polyester-polyol having isocyanate group at two terminals, by reacting a high molecular weight polyester polyol and a diisocyanate compound under an excess of isocyanate groups. This prepolymer is then polymerized in a suitable solvent, with a chain extender and a polymerization inhibitor. It is possible to obtain more homogeneous polyurethane-resin solutions according to this two-step method.

Solvents that may be used for the synthesis of polyurethane resins are benzene, toluene, xylene or other aromatic-type solvents usually known as solvents for a printing ink, ethyl acetate, butyl acetate, or other ester-type solvents, methanol, ethanol, isopropyl alcohol, n-butanol, or other alcoholic solvents, acetone, methyl-ethyl ketone, methyl-isobutyl ketone or other ketone-type solvents or a mixture thereof may be used.

The chain extenders for polyurethane resins that may be used are, for example, ethylene diamine, propylene diamine, hexamethylene diamine, diethylene triamine, triethylene tetramine, isophorone diamine or dicyclohexyl-methane-4,4'-diamine. It is also possible to use diamines comprising hydroxyl group in their molecule, such as, for example, 2-hydroxyethyl-ethylene diamine, 2-hydroxyethyl-propylene diamine, di-2-hydroxyethyl-ethylene diamine, di-2-hydroxyethyl-propylene diamine, 2-hydroxypropyl-ethylene diamine, di-2-hydroxypropyl-ethylene diamine or equivalents thereof.

The polymerization inhibitors that may be used are, for example, dialkylamines such as, for example, di-n-butylamine.

When the chain extender, the polymerization inhibitor or the stabilizer used for the synthesis of the polyurethane resins, are compounds containing an amino group, the amine value of the obtained polyurethane resins is 0–10 (KOH mg/g). When the amine value is in that range, the polyurethane resins show excellent laminate applicability and adhesion onto films such as polypropylene films, polyester films and polyamide films, due to a soft-segment effect of the contained amino group and the above-mentioned trimethyl-1,6-hexane diol.

The amine value is defined as the amount of hydrochloric acid necessary to neutralize tertiary amines remaining in 1 g of a sample, when the secondary and primary amines have been transformed into acetate by glacial acetic acid.

The polyurethane resins have preferably a number average molecular weight of 5,000–100,000. When it is less than 5,000, when it is used as a binder, the dryability of the corresponding printing ink, the blocking resistance and the mechanical strength of the layer, the oil resistance and other properties are lowered. When it is more than 100,000, the viscosity of the polyurethane resin solutions becomes high thus lowering the printing gloss and second solubility, and causing a darkening phenomenon in printing. The solid-resin concentration of the polyurethane resin in the solutions is not limited but is preferably 15–30% by weight which is more suitable for the machines when printing. The viscosity is preferably 50–100,000 cp/25° C. in practical uses.

The chlorinated polyolefin (I-2) used in the first aspect of the present invention is obtained by chlorination of polypropylene homopolymers or copolymers obtained from, for example, propylene homopolymers and other olefine-type monomers.

The chlorine content is 1–60% by weight and preferably 10–40% by weight. The number average molecular weight of the chlorinated polypropylene is 5,000–200,000 and preferably 10,000–100,000. The chlorinated polyolefins may be stereospecifically atactic or isotactic.

Binder Composition

The binder composition of the first aspect of the invention is optionally a mixture of polyurethane resin (I-1) and chlorinated polyolefin (I-2) wherein the ratio of polyurethane resin (I-1)/chlorinated polyolefin (I-2) is preferably 5/95–95/5 (% by weight). The compatibility between the polyurethane resins and chlorinated polyolefin resins is inherently poor but the binder composition of the present invention is a homogeneous and transparent solution since the polyurethane resin used is obtained from the above-mentioned specific high molecular-weight polyester-polyols.

The binder composition of the first aspect of the invention has well-balanced properties to form a coated layer and thus may be used as a coating material as it is.

Coatings, Printing Inks and Adhesive Compositions

The binder composition of the invention may be used as a coating, a printing ink composition and an adhesive composition by kneading other resins or other additives in a solvent and by dispersing a pigment.

The other resins that may be added are, for example, alkyd resins, acrylic resins, polyacrylic polyols, polyester resins, polyester polyols, polyether resins, polyether polyols and polyurethane resins or the like.

The coatings of the present invention are obtained by mixing the binder composition with a curing agent such as isocyanate compounds, thereby, the petrol resistance, the weatherability, the moisture resistance and the hot-water resistance (boil retortability) as well as the properties required for forming a coated layer can be improved by painting the corresponding coating, the printing inks and the adhesive compositions.

The isocyanate compounds that may be used are, for example, the above-mentioned diisocyanate compounds. These diisocyanate compounds may be transformed into isocyanate derivatives such as burettes, isocyanurate compounds, an adduct of trimethylolpropane adduct, and then used as isocyanate compounds.

The binder compositions, coatings, printing inks and adhesive compositions of the invention may be used as adhesives, decoration and surface protection of various kinds of synthetic resins. Resin types such as polypropylenes, nylons, polyesters and the like can be exemplified. These resins may have various forms such as films, sheets or others.

The first aspect of the present invention will be further specifically explained below with Examples.

The present invention is not limited to the Examples given below. The term % refers to "% by weight" unless otherwise indicated.

SYNTHESIS EXAMPLE I-1
Synthesis of Polyester Glycol 1,578.2 g of a mixture of 3,3,5-trimethylhexanediol and 2,2,4-trimethylhexanediol (ratio 1:2.7) was introduced into a 3 litre flask equipped with a condenser, a tube for removing water, a thermometer, a stirrer and an nitrogen gas inlet tube. 1,194.9 g of adipic acid was then introduced and the mixture was allowed to react by heating. When the internal temperature was near 160° C., distilling out of water was started and the reaction was followed for approximately 4 hours until the reaction temperature reached 180° C. When the distilling out of water had slowed down, the reaction temperature reached 200° C. and distilling out of water was continued. When an acid value of the reaction solution of 5–10 had been obtained, 10 ppm of tetrabutyl titanate was added and the internal temperature reached 210° C. and the reaction was followed. After 6 hours, when the acid value was not more than 0.5, the reaction was stopped. The resulting mixture was a solution of polyester glycol. This solution showed an acid value of 0.2, a hydroxyl group value of 56.4 and a viscosity of 11,900 cp/25° C. APHA was 10.

SYNTHESIS EXAMPLE I-2
Synthesis of Polyurethane Resin A 222 g of isophorone diisocyanate was introduced into a 2 litre flask equipped with a stirrer, a thermometer and a nitrogen inlet tube. When the internal temperature had reached 60° C., 1,000 g of the polyester glycol solution obtained in the Synthesis Example I-1 was added dropwise therein for 30 minutes.

After the addition, the reaction temperature was kept at 100° C. and the mixture was allowed to react for 4 hours. A urethane prepolymer having a free isocyanate value of 3.2% was then obtained. 815 g of methyl ethyl ketone was then added into the above-mentioned prepolymer and stirred to obtain a homogeneous solution (hereinafter designed as "solution A'").

78.2 g of isophorone diamine, 1.16 g of di-n-butylamine, 1221.5 g of methyl ethyl ketone and 1,024.4 g of isopropyl alcohol were then stirred and homogenized in a 5 liters flask.

When the temperature of the reaction mixture was adjusted between room temperature and 40° C., all the amount of the "solution A'" was added dropwise over 30 minutes, the internal temperature reached 50° C. and the reaction was followed for 3 hours.

The resulting polyurethane resin solution (hereinafter referred as "solution A") showed a solid resin content of 30%, a viscosity of 2,440 cp/25° C. and a Mn of 56,880, Mw/Mn of 1.98 and Mw of 112,780, which were measured by GPC.

SYNTHESIS EXAMPLE I-3
Synthesis of Polyurethane Resin B 222 g of isophorone diisocyanate were introduced into a 2 litre flask equipped with a stirrer, a thermometer and a nitrogen inlet tube. When the internal temperature had reached 60° C., 1,000 g of poly-3-methylpentanediol adipate (molecular weight of 2,000) was added dropwise therein over 30 minutes.

After the addition, the reaction temperature was kept at 100° C. and the mixture was allowed to react over 4 hours. A urethane prepolymer having a free isocyanate value of 3.28% was thus obtained. 815 g of methyl ethyl ketone were then added into the above-mentioned prepolymer and stirred to obtain a homogeneous solution (hereinafter designed as "solution B'").

79.4 g of isophorone diamine, 1.29 g of di-n-butylamine, 1209.9 g of methylethyl ketone and 1014.7 g of isopropyl alcohol were then stirred and homogenized in a 5 liters flask. When the temperature of the reaction mixture was adjusted between ambient temperature and 40° C., the total amount of the "solution B'" was added dropwise over 30 minutes, the internal temperature reached 50° C. and the reaction was followed for 3 hours.

The resulting polyurethane resin solution (hereinafter referred to "solution B") showed a solid resin content of 30%, a viscosity of 7,180 cp/25° C., Mn of 63,630, Mw/Mn of 1.82 and Mw of 115,720, which were measured by GPC.

SYNTHESIS EXAMPLE I-4
Synthesis of Polyurethane Resin C 222 g of isophorone diisocyanate were introduced into a 2 litre flask equipped with a stirrer, a thermometer and a nitrogen inlet tube. When the internal temperature had reached 60° C., 1,000 g of a caprolactone-type high molecular weight diol having a molecular weight of 2,000 (trade name: "Placcel L-220AL", produced by Daicel Kagaku Kogyo, Ltd) was added dropwise therein over 30 minutes. After the addition, the reaction temperature was kept at 100° C. and the mixture was allowed to react for 4 hours.

A urethane prepolymer having a free isocyanate value of 3.28% was then obtained. 815 g of methyl ethyl ketone was then added into the above-mentioned prepolymer and stirred to obtain a homogeneous solution (hereinafter designed as "solution C'"). 79.4 g of isophorone diamine, 1.29 g of di-n-butylamine, 1209.9 g of methyl ethyl ketone and 1,014.7 g of isopropyl alcohol were then stirred and homogenized in a 5 liters flask. When the temperature of the reaction mixture was adjusted between a room temperature and 40° C., the total amount of the "solution C'" was added dropwise over 30 minutes, the internal temperature had reached 50° C. and the reaction was continued for 3 hours.

The resulting polyurethane-resin solution (hereinafter referred to "solution C") showed a solid resin content of 30%, a viscosity of 7,180 cp/25° C., a Mn of 63,630, Mw/Mn of 1.82 and Mw of 115,720, which were measured by GPC.

EXAMPLE I-1

100 g of chlorinated polypropylene (produced by Nippon Seishi, Ltd. trade name "Super Chlone 813A", having a chlorine content of 30% by weight, non-volatile component of 30% by weight) was mixed with 200 g of the polyurethane resin A obtained in Synthesis Example I-2 to form a homogeneous and transparent binder composition (non-volatile components of 30% by weight).

5 g of the obtained binder composition (solid content of 30%) was dropped onto a glass plate. After drying, the compatibility between the polyurethane resin and the chlorinated polypropylene was observed. The resulting resin was transparent thereby proving the entire compatibility of the components one another.

EXAMPLE I-2

The polyurethane resin A obtained in Synthesis Example I-2 and a chlorinated polyolefin were mixed in various weight ratios as shown in Table 2. The resulting mixture was mixed with titanium dioxide (Ishihara Sangyo Ltd., a Rutile-type "R-820") and Carmin 6BN (Toyo Ink Seizo, Co. Ltd., an azo-type organic pigment) or the like, and kneaded in a sand mill for 2 hours to produce a white ink and a red ink, respectively.

Untreated polypropylene films (hereinafter, referred to "non-treated PP", #4 Coating rod), Corona-discharge-treated polypropylene-films (hereinafter referred to "treated PP"), polyethylene terephthalate films (hereinafter, referred to "PET") and nylon films (hereinafter, referred to "NY") were painted with the obtained inks and dried at room temperature for 24 hours, respectively. A Cellophane tape peeling test using a cellophane adhesive tape, and a heat seal strength test were performed.

The Cellophane tape peeling test proved that when a cellophane tape stuck onto the ink-painted surface, this tape can be quickly removed. Further, the heat seal strength test was performed by applying a pressure of 1 kg/cm$^2$ at 110° C. for 1 second, on the painted surface. After 24 hours, a 180° peeling strength test was performed with a Tensilon. The tensile speed was 50 mm/min. Table I-1 shows the results of these tests.

COMPARATIVE EXAMPLE I-1

The same tests were performed as in the Example I-2, except that the polyurethane B obtained in Synthesis Example I-3 was employed, instead of the polyurethane A obtained in Synthesis Example I-2. Further, the compatibility regarding the binder composition as in Example I-1 was previously observed. However, the dried resins became cloudy, and showed a non-compatibility.

COMPARATIVE EXAMPLE I-2

The same tests were performed as in the Example I-2, except that the polyurethane C obtained in Synthesis Example I-3 was employed, instead of the polyurethane A obtained in Synthesis Example I-2. Further, the compatibility regarding the binder composition as in Example I-1 was previously observed. However, the dried resins became cloudy and showed a non-compatibility.

TABLE I-1

|  | Example I-1 | | Comparative Example I-1 | | Comparative Example I-2 | |
| --- | --- | --- | --- | --- | --- | --- |
|  | white | red | white | red | white | red |
| Cellophane tape peeling test | | | | | | |
| non-treated PP | good | good | poor | poor | poor | poor |
| treated PP | good | good | poor | poor | poor | poor |
| PET | good | good | good | good | good | good |
| NY | good | good | good | good | good | good |

TABLE I-1-continued

|  | Example I-1 | | Comparative Example I-1 | | Comparative Example I-2 | |
| --- | --- | --- | --- | --- | --- | --- |
|  | white | red | white | red | white | red |
| heat seal | | | | | | |
| no-treated PP | 124 | 110 | 35 | 29 | 37 | 31 |
| treated PP | 212 | 191 | 32 | 30 | 36 | 31 |
| PET | 228 | 193 | 176 | 168 | 182 | 172 |
| NY | 226 | 189 | 179 | 173 | 181 | 180 |

TABLE I-2

(parts by weight)

|  | Example I-1 | | Comparative Example I-1 | | Comparative Example I-2 | |
| --- | --- | --- | --- | --- | --- | --- |
|  | white | red | white | red | white | red |
| Resin A of Synthesis Example I-2 | 66.7 | 66.7 | | | | |
| Resin B of Synthesis Example I-3 | | | 66.7 | 66.7 | | |
| Resin C of Synthesis Example I-4 | | | | | 66.7 | 66.7 |
| Super Chlone 813A | 33.3 | 33.3 | 33.3 | 33.3 | 33.3 | 33.3 |
| toluene | 9 | 9 | 9 | 9 | 9 | 9 |
| methyl ethyl ketone | 9 | 9 | 9 | 9 | 9 | 9 |
| isopropanol | 16 | 16 | 16 | 16 | 16 | 16 |
| titanium dioxide | 15 | | 15 | | 15 | |
| Carmin 6 BN | | 7 | | 7 | | 7 |

Regarding the coating compositions used for a decoration paper made of a polyolefin-type resin of the second aspect of the present invention, it contains as a primary component, a chlorinated polyolefin (II-2) and a polyurethane resin (II-1) obtained by reacting a high molecular weight polyester polyol with a diisocyanate compound.

However, the high molecular weight polyester polyols mentioned here have not less than 50% by weight of ester units derived from a dicarboxylic acid and specified trimethyl-1,6-hexanediols (hereinafter, designed as TMHD) such as, at least, 3,3,5-trimethyl-1,6-hexanediol and/or 2,2,4-trimethyl-1,6-hexanediol. These polyester polyols have alcohol hydroxyl group termini and have a number-average molecular weight of 500–5,000.

Consequently, the above-mentioned polyester polyols used in the present invention may be, for example, (a) polyester polyols having alcohol hydroxyl group at the terminals which are obtained from a TMHD and a dicarboxylic acid;

(b) polyester polyols having alcohol hydroxyl group at the terminals which are obtained from a mixture of TMHD with another polyol and a dicarboxylic acid;

(c) a mixture of polyester polyols having alcohol hydroxyl group at the terminals which are obtained from the above-mentioned other polyols, a dicarboxylic acid and the above-mentioned polyester polyols (a) or (b);

(d) apart from the above-mentioned polyester polyols, a mixture of polyester polyols having alcohol hydroxyl group at the terminals and the above-mentioned polyester polyols (a), (b) or (c) .

Regarding the dicarboxylic acid which is a composing component of the polyester polyols in the second aspect of the present invention, linear aliphatic dicarboxylic acids, cyclo-aliphatic dicarboxylic acids and aromatic dicarboxylic acids or the corresponding anhydrous compounds or esterified compounds may be used as suitable compounds. More specifically, examples are as given in the first aspect of the present invention.

The indispensable polyester polyols used to produce the polyurethane resins of the second aspect of the invention are 3,3,5-trimethyl-1,6-hexanediol and/or 2,2,4-trimethyl-1,6-hexanediol. The intended purpose of the present invention are not achieved unless the composing component of the polyester polyols in the invention are the polyols described below.

Regarding the second aspect of the invention, it is possible to obtain a coating composition and a coating having intended coating properties by using the above-mentioned TMHD, as composing component of a polyester polyol. The TMHD unit greatly contributes to the development of the compatibility between the chlorinated polyolefin during their transformation into a polyurethane. For this reason, the TMHD is an essential component of the polyester polyols.

The other polyols that may be used with the above-mentioned essential TMHD may be, for example, low molecular weight glycols which are saturated or not, and which comprise the high molecular weight polyester polyols (2) exemplified in the first aspect of the invention.

The other polyester polyols that may be used in the second aspect of the present invention, apart from the above-mentioned polyester polyols are described in the first aspect of the present invention.

The polyester polyols used in the second aspect of the present invention contain ester units obtained from at least a TMHD and a dicarboxylic acid. The content of the above-mentioned ester units essentially requires not less than 50% by weight, of total ester units. When this content is less than 50% by weight the compatibility between the resulting polyurethane component and the chlorinated polyolefin is insufficient, the gloss and the outer appearance of the coated layer obtained when painting onto a polyolefin-containing decoration paper are lowered. Further, the adhesion of the coated layer is also adversely affected which is not desirable.

Moreover, any polyester polyol having the required content of ester units may be used, as described above. However, the polyester polyols must be high molecular weight polyester polyols having a number average molecular weight of 500–5,000. When the average molecular weight of the polyester polyols is less than 500, the solubility to a solvent for dilution becomes lowered, thereby reducing the coatability. When the number average molecular weight is more than 5,000, the dryability and the blocking resistance are lowered which is not desirable.

The necessary features necessary for the high molecular weight polyester polyols reacted with diisocyanate in the second aspect of the invention are as explained hereinabove but they may be also comprised low molecular weight polyester polyols instead of the above-mentioned polyester polyols as a composing component which have the necessary features.

The low molecular weight polyester polyols are as explained in the first aspect of the present invention and they are used in an amount which represents not more than 10% by weight in the high molecular weight polyester polyol, as explained in the first aspect of the present invention. When the amount used is more than 10% by weight, the adhesion of the resulting coating composition for a decoration paper made of polyolefin-type resins decreases and the solubility in solvents for dilution also decreases.

The diisocyanate compounds used as an essential component in the production of the polyurethane resins of the second aspect of the present invention include aromatic, aliphatic and cycloaliphatic diisocyanates such as the diisocyanates described more specifically in the first aspect of the present invention.

In the synthesis of the above-mentioned polyurethanes (II-1), chain extenders may be optionally used. Specific examples of the chain extenders are ones as explained in the first aspect of the present invention.

Polymerization inhibitors such as a dialkylamine, such as, for example, di-n-butylamine may be optionally used in the above-mentioned urethane resins (II-1).

When the above-mentioned chain extender, polymerization inhibitor and other stabilizers are compounds having an amino group, the polyurethane resins (II-1) of the present invention preferably have an amine value of 0–10 (KOH mg/mg). When the amine value is more than 10 (KOH mg/mg), due to the soft segment effect of the amino group contained and the TMHD, the excellent adhesion of the coating obtained from the coating composition of the present invention for a decoration paper made of a polyolefin-type and its lamination suitability are easily damaged. The amine value is as defined in the first aspect of the invention.

The polyurethane resins (II-1) of the present invention have preferably a number-average molecular weight of 5,000–100,000.

When the number-average molecular weight is less than 5,000, a tendency of decreased dryability of the coating, blocking resistance, film strength, oil resistance and the like was observed. On the other hand, when it is more than 100,000, the viscosity of the polyurethane resin solution becomes high and problems regarding the coatability may be caused.

The main components in the second aspect of the present invention are the above-mentioned polyurethane resins (II-1) and the chlorinated polyolefins (II-2). The chlorinated polyolefins (II-2) are as defined in the first aspect of the present invention.

The coating composition of the second aspect of the present invention comprises, at least, the above-mentioned polyurethane resins (II-1) and the chlorinated polyolefins (II-2). When using only one of them to cover by painting a decoration paper made of a polyurethane-type resin, it is not possible to obtain a desired coated layer having a gloss and a sufficient adhesion, because the chlorinated polyolefins are used as a binder between the polyolefin-containing material to be covered and the coating composition. The TMHD unit in the polyurethanes largely contributes to the compatibility with the chlorinated polyolefins. Consequently, it is possible to obtain a coating composition having an excellent coatability as expected by using as main components polyurethane containing the TMHD and chlorinated polyolefins.

The mixing ratio of amount of these two main components is free and preferably polyurethane resin (II-1)/chlorinated polyolefin (II-2) of 5/95–95/5 (ratio of % by weight) as explained in the first aspect of the present invention.

It is to be noted that the compatibility between the polyurethane resins and the chlorinated polyolefins is poor but the above-mentioned composition used in the present invention is a characteristic homogeneous and transparent solution since the polyurethane (II-1) derived from specified high molecular weight polyester polyols is used.

Regarding the coating for a decoration paper made of polyolefin-type resins according to the present invention, a coating composition containing the above-mentioned polyurethane resins (II-1) and chlorinated polyolefins (II-2), as a main component, may be used as it is. It is also possible to add each sort of necessary components such as, for example, a solvent for a coating, a diluent, pigments, viscosity-adjusting agent, a weatherability agent (light resisting agent) and the like to obtain a coating.

The amount and kind of each of these agents are chosen with regard to the purpose. Regarding the solvent for a coating, benzene, toluene, xylene and other aromatic-type solvents may be usually used as well as ethyl acetate, butyl acetate or other ester-type solvents and methanol, ethanol, isopropyl alcohol, n-butanol or other alcohol solvents, acetone, methyl ethyl ketone, methyl isobutyl ketone or other ketone-like solvents or a mixture thereof may be used.

The second aspect of the invention will be further specifically explained below with Examples. However, the present invention is not limited to these Examples.

SYNTHESIS EXAMPLE II-1
Synthesis of Polyester Polyol 1,578.2 g of a mixture of 3,3,5-trimethyl-1,6-hexanediol and 2,2,4-trimethyl-1,6-hexanediol (ratio by weight 1:2.7) was introduced with 1,194.9 g of adipic acid into a flask of 3 liters equipped with a condenser, a tube for removing water, a stirrer, a thermometer and a nitrogen gas inlet tube. The resulting mixture was heated and allowed to react. When the internal temperature reached about 160° C., distilling out of water was started and the reaction temperature was brought up to 180° C. over about 4 hours. When the distilling out of water slowed down, the reaction temperature reached 200° C. and distilling out of water was then continued.

When the acid value of the reaction solution became 5–10, an amount corresponding to 10 ppm of tetrabutyl titanate was added, the internal temperature reached 210° C. and the reaction was continued. After 6 hours, when the acid value became not more than 0.5, the reaction was stopped and a solution of polyester polyol was obtained.

The obtained solution showed an acid value of 0.2, a hydroxyl group value of 56.4 and a viscosity of 11,900 cp/25° C.

The APHA was equal to 10. The number-average molecular weight of the polyester polyol obtained was 2,000.

SYNTHESIS EXAMPLE II-2
Synthesis of Polyurethane Resin A 222 g of isophorone diisocyanate was introduced into a 2 litre flask equipped with a stirrer, a thermometer and a nitrogen inlet tube. When the internal temperature had reached 60° C., 1,000 g of the polyester polyol solution obtained in the Synthesis Example II-1 was added dropwise therein over 30 minutes. After the addition, the reaction temperature was kept at 100° C. and the mixture was allowed to react for 4 hours. A urethane prepolymer having a free isocyanate value of 3.2% was then obtained. 815 g of methyl ethyl ketone were then added into the above-mentioned prepolymer and stirred to obtain a homogeneous solution (hereinafter, designated as "solution A'").

78.2 g of isophorone diamine, 1.16 g of di-n-butylamine, 1221.5 g of methyl ethyl ketone and 1,024.4 g of isopropyl alcohol were then stirred and homogenized in a 5 liters flask. When the temperature of the reaction mixture was between ambient temperature and 40° C., the total amount of the "solution A'" was added dropwise over 30 minutes, the internal temperature was allowed to attain 50° C. and the reaction was followed for 3 hours.

The resulting polyurethane resin solution (hereinafter, referred to "solution A") showed a solid resin content of 30%, a viscosity of 2,440 cp/25° C. and the number-average molecular weight Mn of 56,880, with Mw/Mn of 1.98 and a weight-average molecular weight Mw of 112,780, which were measured by GPC.

SYNTHESIS EXAMPLE II-3
Synthesis of Polyurethane Resin B 222 g of isophorone diisocyanate was introduced into a 2 litre flask equipped with a stirrer, a thermometer and a nitrogen inlet tube. When the internal temperature had reached 60° C., 1,000 g of a caprolactone-type high molecular-weight diol of a molecular weight of 2,000 (trade name : "Placcel L-220AL", produced by Daicel Kagaku Kogyo, Ltd.) was added dropwise therein over 30 minutes. After the addition, the reaction temperature was kept at 100° C. and the mixture was allowed to react for 4 hours.

Urethane prepolymer having a free isocyanate value of 3.28% was thus obtained. 815 g of methyl ethyl ketone was then added into the above-mentioned prepolymer and stirred to obtain a homogeneous solution (hereinafter designated as "solution B'").

79.4 g of isophorone diamine, 1.29 g of di-n-butylamine, 1209.9 g of methylethyl ketone and 1,014.7 g of isopropyl alcohol were then stirred and homogenized in a 5 liters flask. When the temperature of the reaction mixture was between ambient temperature and 40° C., the total amount of the "solution B'" was added dropwise over 30 minutes, the internal temperature reached 50° C. and the reaction was allowed to continue for 3 hours.

The resulting polyurethane resin solution (hereinafter, referred to "solution B") showed a solid resin content of 30%, a viscosity of 7,180 cp/25° C. and a Mn of 63,630, with Mw/Mn of 1.82 and Mw of 115,720, which were measured by GPC.

EXAMPLE II-1

100 g of chlorinated polypropylene (produced by Nippon Seishi, Ltd., a trade name "Super Chlone 813A"), having a chlorine content of 30% by weight (non-volatile components of 30% by weight), was mixed with 200 g of the polyurethane resin obtained in Synthesis Example II-2 to form a homogeneous transparent binder composition (non-volatile components of 30% by weight). As shown in Table II-2, solvents and pigments were then added and the resulting mixture was kneaded in a sand mill for 2 hours to form a coating.

Decoration papers made of a untreated polypropylene (hereinafter referred to "non-treated PP") and a corona-discharge treated polypropylene decoration paper (hereinafter referred to "treated PP") were painted with the obtained coating using a number 6 bar coater and dried at room temperature for 24 hours. After drying, a Cellophane tape peeling test using a Cellophane adhesive tape and a heat seal strength test were then performed.

Table II-1 shows the results of these tests and Table II-2 shows the formulation of the coating.

COMPARATIVE EXAMPLE II-1

A coating was prepared with the polyurethane obtained in Synthesis Example II-2 and without the chlorinated polypropylene.

The other tests are as in Example II-1.

Table II-1 shows the results of these tests and Table II-2 shows the composition of the coating.

COMPARATIVE EXAMPLE II-2

A coating was prepared with the polyurethane obtained in Synthesis Example II-3 and without the chlorinated polypropylene.

The other tests are as in Example II-1.

Table II-1 shows the results of these tests and Table II-2 shows the formulation of the coating.

TABLE II-1

| Tests | decoration paper used | Example II-1 | Comparative Example II-1 | Comparative Example II-2 |
|---|---|---|---|---|
| Cellophane tape peeling test | non-treated PP | good | poor | poor |
| | treated PP | good | poor | poor |
| heat seal strength test (g/cm) | non-treated PP | 110 | 29 | 31 |
| | treated PP | 191 | 30 | 31 |
| | non-treated PP | glossy | cloudy | cloudy |
| | treated PP | glossy | cloudy | cloudy |

In table II-1:
(1) Cellophane tape peeling test: Cellophane tape stuck onto the painted surface was quickly peeled.
(2) Heat seal strength test: Test was performed by applying a pressure of 1 kg/cm² for 1 second at 110° C. on the painted surface. After 24 hours, a 180° peeling strength-test was performed (tensile speed 50 mm/min).
(3) The terms "decoration paper used" referred to the decoration paper which was painted.
(4) In the Cellophane tape peeling test, when the rest of the tape is not less than 80%, the test is considered as "good", otherwise, when the rest of the tape is less than 80% the result is "poor".
(5) In the heat seal strength test, when the measured value is not less than 100, it is considered to be practically used, otherwise when the measured value is less than 100, it is considered that there are some problems in practical use.

TABLE II-2

| | (Unit : parts by weight) | | |
|---|---|---|---|
| Coating Composition | Example II-1 | Comparative Example II-1 | Comparative Example II-2 |
| Example II1 composition | 66.7 | | |
| Comparative Example II-1 composition | | 66.7 | |
| Comparative Example II-2 composition | | | 66.7 |
| toluene | 9 | 9 | 9 |
| methyl ethyl ketone | 9 | 9 | 9 |
| isopropanol | 16 | 16 | 16 |
| carmin 6BN (red) | 7 | 7 | 7 |

The Carmin 6Bn is produced by Toyo Ink, Ltd., and it is an azo-type organic pigment.

The laminated cloth of the third aspect of the present invention is made from a woven cloth, one side or both sides thereof are coated by a polyurethane resin. The polyurethane resin may be flatly coated as being laminated onto a woven cloth, and may be coated as being impregnated into filaments of the woven cloth. resin may be flatly coated as being laminated onto a woven cloth, and may be coated as being impregnated into filaments of the woven cloth.

First of all, the woven cloth is illustrated. The woven cloths that may be used are, a polyethylene terephthalate homopolyester or other polyesters, copolyesters obtained by a copolymerization of isophthalic acid, 5-sodium sulpho isophthalic acid, adipic acid or other aliphatic dicarboxylic acids on the acid component forming the repeated unit of polyesters or homopolyesters, 6,6-nylon, 6-nylon, 12-nylon, 4,6-nylon or copolymers thereof, polyamides obtained by polymerizing on a nylon, polyalkylene glycols, dicarboxylic acid and amines, aramides such as copolymers of paraphenylene terephthalamide and aromatic ethers, paraphenylene sulphones, polysulphones and other sulphone-type resins, polyether ketones resins or other synthetic fibers, carbon fibers, glass fibers or other continuous monofilament or multifilament yarn.

Regarding the above-mentioned filament yarn, those having a size of 400–1000 Deniers, as used in the prior art, may be also used. The method for weaving the filament yarn to obtain a woven cloth may be flatly-weaving, crossedly-weaning or other methods. The woven cloth used preferably has a surface density of 50–250 g/m² and a mechanical strength of 150–1000 kg/3 cm of width.

Since the above-mentioned woven cloth is coated (painted) with a polyurethane resin, the filament yarn itself may contain various kinds of additives during the production process and the manufacturing process. For example, it may contain a thermal stabilizer, an antioxidant, a light stabilizer, smoothing agents, anti-electrostatic agents, plasticizer, thickeners, pigments, flame retardants or the like. The woven cloth may also be impregnated by the flame retardant after.

The polyurethane resins which coat the woven cloth will now be explained below.

The polyurethane resins employed in the third aspect of the present invention contain polyurethane resins obtained by reacting a high molecular weight polyester polyol and a diisocyanate compound.

The above-mentioned high molecular weight polyester polyols have alcoholic hydroxyl groups at the terminals and contain not less than 50% of the total weight of ester units of the aliphatic dicarboxylic acids and the TMHD compounds. The above mentioned high molecular weight polyester polyols are obtained from the aliphatic dicarboxylic acids and, at least, 3,3,5-trimethyl-1,6-hexanediol and/or 2,2,4-trimethyl-1,6-hexanediol (hereinafter designed as trimethyl-1,6-hexanediol or TMHD compounds).

Consequently, the high molecular-weight polyester-polyols used in the present invention are, for example,
(1) polyester polyols obtained from aliphatic dicarboxylic acids and the TMHD compounds;
(2) polyester polyols which are a mixture of polyester polyols obtained from aliphatic dicarboxylic acids and the TMHD compounds and other polyols;
(3) polyester polyols made from an aliphatic dicarboxylic acid and another polyol; or a mixture of another polyester polyol and the above-mentioned polyester polyols (1) and (2).

The above-mentioned polyester polyols have preferably a number average molecular weight (in the present invention, the molecular weight always refers to number average molecular weight unless specified otherwise) of 500–5,000. When the number-average molecular weight is less than 500, the solubility to diluents decreases thus affecting the coatability. When the number-average molecular weight is more than 5,000, the dryability and the blocking resistance are insufficient. The high molecular weight polyester polyols, except those mentioned above.

The polyurethane resins of the third aspect of the present invention may contain low molecular weight polyols in a weight ratio of less than 10% by weight of the high molecular weight polyols, as a composing component. The low molecular weight polyols are, for example, aliphatic dibasic acid esters such as polytrimethyl-hexane diols and, particularly, an adipate or a variety of the above-mentioned low molecular-weight polyester-polyols used to produce high molecular-weight polyester-polyols.

When the ratio by weight of the low molecular-weight polyesters-polyols is more than 10%, the adhesion between the coating and the woven cloth decreases as well as the solubility to diluents.

The diisocyanate compounds of the third aspect of the present invention are as specified in the first aspect of the present invention. Diisocyanates having an isocyanate group such as aliphatic or cyclo-aliphatic compounds which is bound to an aliphatic hydrocarbon, are preferably used from a view point of weatherability or the like for the polyurethane resins of the third aspect of the invention which are laminated on the external surface of a woven cloth.

In the third aspect of the invention, it is also possible to add a chain extender in the polyurethane resins. The chain extender is as described in the first aspect of the present invention. When the chain extender, the polymerization inhibitor and the stabilizer or other are compounds having an amino group, the resulting polyurethane resins preferably have an amine value of 0–10 (KOH mg/g). When the amine value is in that range, due to the soft-segment effect of the above-mentioned compounds containing an amino group and the above-mentioned trimethyl-1,6-hexanediol, the adhesion of the polyurethane resins for the woven cloth is excellent thus conferring laminate suitability thereto.

The polyurethane used in the third aspect of the invention have a number-average molecular weight (Mn) as explained in the first aspect of the present invention.

Further, in the third aspect of the present invention, it is also possible to add a flame retardant. A thio-urea type compound, a halogen-type organic compound, specially chlorinated polyolefins, phosphorus-containing organic-compounds, inorganic flame retardant or other may be added. The chlorinated polyolefins are as explained in the first aspect of the present invention.

The proportions by weight of the polyurethane resin (III-1) and the chlorinated polyolefins are the same as those described in the first aspect of the present invention. Since the compatibility between the chlorinated polyolefins and the polyurethane resins is poor, the composition of the present invention preferably contains polyurethane resins made from specified high molecular weight polyester polyols whereby forming, in a characteristic manner, a homogeneous and transparent solution.

The laminating method for covering by painting the above-mentioned polyurethane resins thus forming a laminated film may be a coating method consisting of applying by painting a solution of the above-mentioned polyurethane resins (III-1) and drying, a coating method consisting of applying a urethane resin film by compressing or heating, an extrusion-laminating method or other usual coating method. Moreover, it is also possible to use a dry-laminating method using optionally an adhesive or a hot-melt adhesive.

When the polyurethane resins (III-1) are painted in the form of a solution, it is possible to use a solvent such as benzene, toluene, xylene, or other aromatic solvent, ethyl acetate, butyl acetate or other ester-type solvents, methanol, ethanol, isopropyl alcohol, n-butanol or other alcohol solvents, acetone, methyl ethyl ketone, methyl-isobutyl ketone, or other ketone-type solvents, or a mixture thereof.

The polyurethane-resin film may be obtained from a polyurethane resin solution. However, it is also possible to heat-melt and extrude a film of a polyurethane resin itself obtained by reacting a polyester polyol and an isocyanate compound.

The thickness of the laminated layer is 1–100 μm and preferably 5–30 μm. The coating amount is 10–200 g/m² and preferably, 20–100 g/m².

The laminated layer may be on the whole surface of the woven cloth constituting an air bag. However, when the average air permeability is of 2 ml/cm²/min, on the whole surface of the air bag, the woven cloth may be partially coated.

The stretching and tear resistance of the polyurethane resins are added to the mechanical strength of the woven cloth thus improving the mechanical strength of the air bag.

The third aspect of the present invention will be further specifically explained below on the basis of Examples. It is to be noted that the term "%" refers to "percent by weight" unless specified otherwise.

SYNTHESIS EXAMPLE III-1

Synthesis of Polyester Polyol 1,578.2 g of a mixture of 3,3,5-trimethyl-1,6-hexanediol and 2,2,4-trimethyl-1,6-hexanediol (ratio by weight 1:2.7) was introduced with 1,194.9 g of adipic acid into a 3 liters flask equipped with a condenser, a tube for removing water, a stirrer, a thermometer and a nitrogen gas inlet tube. The resulting mixture was heated and allowed to react. When the internal temperature reached about 160° C., distilling out of water was started and the reaction temperature was brought up to 180° C. over about 4 hours. When the distilling out of water was slowed down, the reaction temperature reached 200° C. and distilling out of water was continued.

When the acid value of the reaction solution reached 5–10, 10 ppm of terabutyl titanate was added, the internal temperature reached 210° C. and the reaction was continued. After 6 hours, when the acid value became not more than 0.5, the reaction was stopped and a solution of polyester polyol was obtained.

The obtained solution showed an acid value of 0.2, a hydroxyl group value of 56.4 and a viscosity of 11,900 cp/25° C.

The APHA was equal to 10. The number-average molecular weight of the polyester polyol obtained was 2,000.

SYNTHESIS EXAMPLE III-2

Synthesis of Polyurethane Resin A 222 g of isophorone diisocyante was introduced into a 2-liter flask equipped with a stirrer, a thermometer and a nitrogen inlet tube. When the internal temperature had reached 60° C., 1,000 g of the polyester polyol solution obtained in the Synthesis Example III-1 was added dropwise therein over 30 minutes. After the addition, the reaction temperature was kept at 100° C. and the mixture was allowed to react for 4 hours.

Urethane prepolymer having a free isocyanate value of 3.2% was then obtained. 815 g of methyl ethyl ketone were then added into the above-mentioned prepolymer and stirred to obtain a homogeneous solution (hereinafter, designed as "solution A'").

78.2 g of isophorone diamine, 1.16 g of di-n-butylamine, 1221.5 g of methyl ethyl ketone and 1,024.4 g of isopropyl alcohol were then stirred and homogenized in a 5 liters flask.

When the temperature of the reaction mixture was between ambient temperature and 40° C., the total amount of the "solution A'" was added dropwise over 30 minutes, the internal temperature reached 50° C. and the reaction was followed for 3 hours.

The resulting polyurethane resin solution (hereinafter, referred to "solution A") showed a solid resin content of 30%, a viscosity of 2,440 cp/25° C. and a Mn of 56,880, with Mw/Mn of 1.98 and Mw of 112,780, which were measure by GPC.

EXAMPLE III-1

A woven cloth having a total denier of 500 Deniers, 96 filaments, made of polyester fine fibers having a mechanical strength of 9.0 g/denier. The flatly-woven cloth used was made of fibers having 39 fibers per inch in both warps and wefts. The flatly-woven cloth was submitted to a flame-retarding treatment by impregnation with a thio-urea compound.

The polyurethane resin solution A obtained in Synthesis Example III-2 was painted so as to coat one surface the woven cloth. When dried, the weight of the coated layer was 50 g/m$^2$.

The film was then heated and dried to obtain a laminated cloth. The laminated cloth was cut and an air bag was made in such a way that the laminated portion became the internal side thereof.

EXAMPLE III-2

Instead of the polyurethane resin solution A obtained in Synthesis Example III-2 and used in Example III-1, a mixture of 200 g of the polyurethane resin A obtained in Synthesis Example III-2 and 100 g of chlorinated polypropylene (Nippon Seishi, Ltd "Super Chlone 813A", chlorine content was 30% by weight and non-volatile components of 30% by weight) was used. This mixture forms a homogeneous transparent composition. The other matters were as in Example III-1.

EXAMPLE III-3

A flatly-woven cloth of fine 6,6-nylon fibers having a mechanical strength of 9.5 g/denier and a total Denier of 840 deniers, 162 filaments, having 25 fibers/inch in both warps and wefts.

The polyurethane resin solution A obtained in Synthesis Example III-2 was painted after impregnated from one surface of the woven cloth. When dried, the weight of the coated layer was 40 g/m$^2$. The film was then heated and dried to obtain a laminated cloth. The laminated cloth was cut to make an air bag.

EXAMPLE III-4

A flatly-woven cloth of fine 6-nylon fibers, having a mechanical strength of 9.1 g/denier and a total Denier of 420 deniers, 72 filaments, having a fiber diameter of 45 fibers/inch in both warps and wefts.

5 parts by weight of thio-urea was mixed with 100 parts by weight of the solution A of the polyurethane resin obtained in Synthesis Example III-2. This mixture was coated on both sides of a woven cloth so as to form a coated layer having a total weight of 55 g/m$^2$ when drying. The layer was then heated and dried to obtain a laminated cloth. The laminated cloth was cut and an air bag was made in such a way that the laminated portion became the internal side thereof.

All of the air bags obtained in the above-mentioned Examples have a good adhesion to the woven cloth, were light and have an excellent mechanical strength, were fireproof and further since they do not contain plasticizer in the coating layer, there is no adhesion between the woven cloths, the inflater worked even if the air bag was stored at a high temperature for a long time. When an inflater worked, the air bag smoothly dilated.

It was difficult to open a pin hole with the minute metallic fragment produced from the inflater. The air impermeability was not more than 2 ml/cm$^2$/min.

Industrial Applicability

The binder composition of the first aspect of the invention is excellent in transparency. The coating containing this binder composition shows an excellent adhesion on various synthetic resins such as polyolefins, nylons, polyesters having different features.

According the second aspect of the present invention, it is easy to obtain a coating composition and a coating forming a glossy film on a decoration paper made of polyolefin-type resins without any damage regarding the outer appearance thereof, and having an adhesion to the decoration paper and coatability thereon.

According to the third aspect of the present invention, it is easy to obtain an air bag having a high mechanical strength, which is light and formed with a thin layer. This air bag has an excellent inflatibility and adhesion to the woven cloth, an excellent weatherability and a pin hole resistance without any leaking of additives.

What is claimed is:

1. A binder composition obtained from a chlorinated polyolefin and a polyurethane resin, said polyurethane resin being obtained by reacting a diisocyanate compound and a high molecular weight polyester polyol, said high molecular weight polyester polyol comprising not less than 50% by weight of a polyester glycol having a molecular weight of 500–5,000, said polyester glycol being obtained by reacting an acid and 3,3,5-trimethyl-1,6-hexanediol or 2,2,4-trimethyl-1,6-hexanediol.

2. A coating, a printing-ink or an adhesive composition obtained from the binder composition according to claim 1 and an isocyanate compound.

3. A coating composition for a decoration paper made of a polyolefin resin, the coating composition comprising a chlorinated polyolefin and a polyurethane resin, said polyurethane resin being obtained by reacting a diisocyanate compound and a high molecular weight polyester polyol having a number average molecular weight of 500–5,000, said polyester polyol having an alcohol hydroxyl group at terminals thereof and comprising not less than 50% by weight of ester units, said ester units being derived from a dicarboxylic acid and 3,3,5-trimethyl-1,6-hexanediol and/or 2,2,4-trimethyl-1,6-hexanediol.

4. A coating composition for a decoration paper made of a polyolefin-type resin according to claim 3, wherein said dicarboxylic acid is an aliphatic dicarboxylic acid.

5. A coating composition for a decoration paper made of a polyolefin-type resin according to claim 4, wherein said aliphatic dicarboxylic acid is adipic acid.

6. A coating composition for a decoration paper made of a polyolefin resin, the coating composition comprising the coating composition according to claim 3.

7. A laminated cloth obtained by laminating a polyurethane resin on, at least, one surface of a woven cloth made of synthetic resins, said polyurethane resin being obtained from a diisocyanate compound and a polyester polyol having a number-average molecular weight of 500–5,000 and comprising not less than 50% by weight of ester units of an aliphatic dicarboxylic acid and trimethyl-1,6-hexanediols.

8. A laminated cloth according to claim 7, wherein said aliphatic dicarboxylic acid is adipic acid.

9. A laminated cloth according to claim 7, wherein said polyurethane resin comprises a flame retardant.

10. A laminated cloth according to claim 9, wherein said flame retardant is a chlorinated polyolefin or a thio-urea compound.

11. A laminated cloth according to claim 8, wherein said polyurethane resin comprises a flame retardant.

12. An air-bag for a vehicle, wherein said air bag is made from a laminated cloth according to claim 7.

13. An air-bag for a vehicle, wherein said air bag is made from a laminated cloth according to claim 8.

14. An air-bag for a vehicle, wherein said air bag is made from a laminated cloth according to claim 9.

15. An air-bag for a vehicle, wherein said air bag is made from a laminated cloth according to claim 10.

16. An air-bag for a vehicle, wherein said air bag is made from a laminated cloth according to claim 11.

17. A coating composition for a decoration paper made of a polyolefin resin, the coating composition comprising the coating composition according to claim 4.

18. A coating composition for a decoration paper made of a polyolefin resin, the coating composition comprising the coating composition according to claim 5.

* * * * *